(12) United States Patent
Lee et al.

(10) Patent No.: US 8,204,610 B2
(45) Date of Patent: Jun. 19, 2012

(54) ELETRONIC DEVICE, DISPLAY DEVICE, AND METHOD OF CONTROLLING AUDIO/VIDEO OUTPUT OF AN ELECTRONIC DEVICE

(75) Inventors: Jian-Wei Lee, Taipei (TW); Hsin-Yu Chen, Taipei (TW)

(73) Assignee: Acer Incorporated, New Taipei (TW)

( * ) Notice: Subject to any disclaimer, the term of this patent is extended or adjusted under 35 U.S.C. 154(b) by 399 days.

(21) Appl. No.: 12/501,830

(22) Filed: Jul. 13, 2009

(65) Prior Publication Data

US 2010/0220244 A1 Sep. 2, 2010

(30) Foreign Application Priority Data

Mar. 2, 2009 (TW) .............................. 98106677 A (51) Int. Cl.
G05B 11/01 (2006.01)
G05B 19/42 (2006.01)
G06F 3/048 (2006.01)
(52) U.S. Cl. .............. 700/17; 700/86; 700/89; 715/788; 715/789; 715/803
(58) Field of Classification Search .................. 715/781, 715/788, 789, 810, 811, 803; 700/17, 86, 700/89
See application file for complete search history.

(56) References Cited

U.S. PATENT DOCUMENTS 7,191,407 B1 * 3/2007 Kluttz et al. .................. 715/788
2009/0044146 A1 * 2/2009 Patel et al. .................... 715/808

FOREIGN PATENT DOCUMENTS

| CN | 1115938 | 1/1996 |
|---|---|---|
| CN | 1577466 | 2/2005 |

OTHER PUBLICATIONS

"First Office Action of China Counterpart Application", issued on Feb. 24, 2011, p. 1-p. 7.

* cited by examiner

Primary Examiner — Ronald Hartman, Jr.
(74) Attorney, Agent, or Firm — Jianq Chyun IP Office (57) ABSTRACT

An electronic device, a display device, and a method of controlling audio/video output of the electronic device are disclosed. The electronic device includes a data processing unit, a visual output unit, an audio output unit, and a user operating habit database. The data processing unit executes an application program, the visual output unit outputs an image signal, the audio output unit outputs an audio signal, and the user operating habit database records a corresponding relationship between different program types and operating parameters of the visual output unit or the audio output unit. And, the data processing unit acquires the program type of the application program being run for controlling the operating parameters of the visual output unit or the audio output unit.

16 Claims, 10 Drawing Sheets

ELETRONIC DEVICE, DISPLAY DEVICE, AND METHOD OF CONTROLLING AUDIO/VIDEO OUTPUT OF AN ELECTRONIC DEVICE

FIELD OF THE INVENTION

The present invention relates to an electronic device, a display device, and a method of controlling audio/video output of an electronic device; and more particularly, to an electronic device and display device that can provide operating settings and environment control according to the program type of the application program being executed.

BACKGROUND OF THE INVENTION

The currently commercially available display devices usually provide different scenario setting modes, or allow a user to manually switch among multiple different image quality settings, or use a R/G/B/W histogram to determine features of image content to thereby automatically adjust the image contrast and brightness, or detect ambient light to adjust the backlight. In the prior art, the above adjustments are generally conducted according to information such as image contrast level or backlight environment. However, such information does not necessarily exactly describe the actual situation in which the display device is used.

SUMMARY OF THE INVENTION

It is therefore a primary object of the present invention to provide an electronic device, a display device, and a method of controlling audio/video (AV) output of an electronic device, so that color settings, environment settings, or even application software settings on the electronic device and the display device can be automatically adjusted corresponding to the program type of an application program currently being used by the user, so as to more accurately meet the user's actual requirements in using different application programs.

To achieve the above and other objects, the electronic device according to the present invention includes a data processing unit, a visual output unit, an audio output unit, and a user operating habit database. The data processing unit executes an application program, the visual output unit outputs an image signal, the audio output unit outputs an audio signal, and the user operating habit database records a corresponding relationship between the program type and the operating parameters of the visual output unit or the audio output unit. And, the data processing unit acquires the program type of the application program being executed for controlling the operating parameters of the visual output unit or the audio output unit.

The data processing unit can execute an operating system. When executing an application program under the operating system, the data processing unit is able to acquire the program type via the operating system.

The electronic device further includes an image determining unit for analyzing an interface image generated by an application program being executed, so as to determine the program type of the executed application program.

The display device according to the present invention includes a signal receiving unit, an image determining unit, a user operating habit database, and a control unit. The signal receiving unit receives an image signal containing an interface image of an application program; the image determining unit analyzes the interface image of the application program so as to determine the program type of the application program; the user operating habit database records a corresponding relationship between the program type and the operating parameters of a host side; and the control unit generates a reference signal according to the program type as determined by the image determining unit and the corresponding relationship as recorded in the user operating habit database, and sends the reference signal to the host for changing the operating parameters of the host.

The method of controlling audio/video output of an electronic device according to the present invention includes the following steps. First, the program type of an application program executing on the electronic device is determined. A corresponding relationship between the program type and an operating parameter of the electronic device is then retrieved from a user operating habit database. A control unit is used to generate a reference signal based on the corresponding relationship for changing the operating parameter of the electronic device.

From the above description, it can be found the electronic device, the display device, and the method of controlling audio/video output of an electronic device according to the present invention may provide one or more of the following advantages:

(1) The user's operating habit when executing different application programs is recorded, and such habit information is used as a basis in determining environment settings in order to meet the user's actual requirements.

(2) The electronic device or display device can automatically provide operation settings and environment settings corresponding to the program type of the application program being executed.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
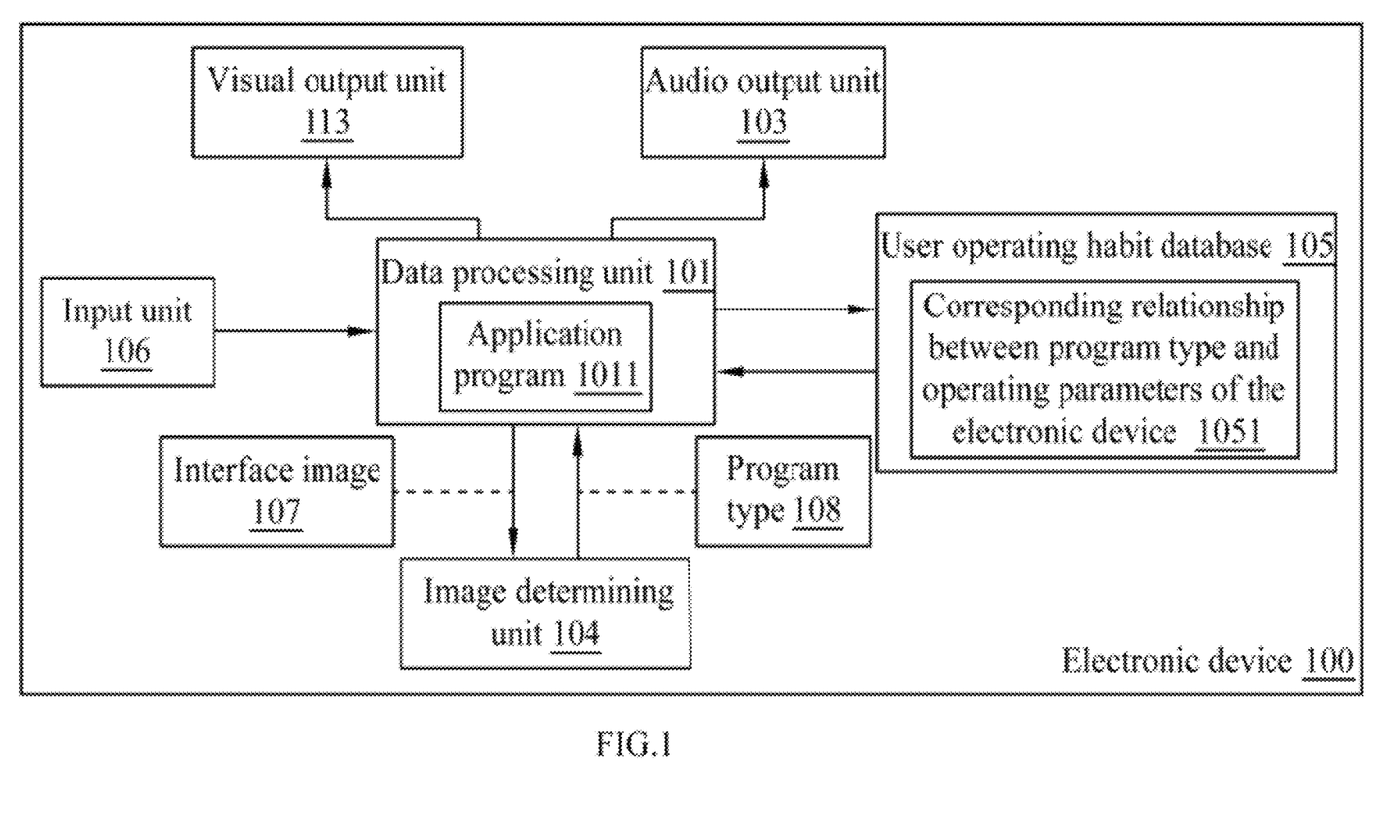
FIG. 1 is a block diagram of an electronic device according to the present invention.

Please refer to FIG. 1, which is a block diagram of an electronic device 100 according to the present invention. As shown, the electronic device 100 includes a data processing unit 101, a visual output unit 113, an audio output unit 103, an image determining unit 104, a user operating habit database 105 and an input unit 106. The data processing unit 101 can run an application program 1011, which may be, for example, a word processing program, such as Word, PowerPoint, and Excel; an image processing program, such as Photoshop; or an AV player program, such as Video Player or MP3 Player program.

The visual output unit 113 is capable of outputting an image signal. By controlling the visual output unit 113, the image signal may be adjusted in image resolution, contrast, and brightness. The image signal may be a radio frequency (RF) signal, a video graphic array (VGA), a digital visual interface (DVI), a high definition multimedia interface (HDMI), or an S-video.

The audio output unit 103 is capable of outputting an audio signal. By controlling the audio output unit 103, the audio signal may be adjusted in volume.

The image determining unit 104 is able to analyze an interface image 107, which is generated by the data processing unit 101 while executing the application program 1011, so as to determine the program type 108 of the application program 1011. The features of images output by the data processing unit 101 when running a word processing program and an AV player program, respectively will be analyzed as the following, and the corresponding ways of determining the program type 108 of the application program 1011 being executed will be described.

While the word processing program is executed, shortcut toolbars are usually arranged near upper and lower edges or left and right edges thereof in the interface image 107. And, fast varying image contents are not usually shown on the interface image 107 which is generated while running the word processing program. Instead, only simple colors and regularly shaped objects are presented.

On the other hand, while the AV player program is executed, the interface image 107 thereof usually has two black bars arranged at upper and lower edges or left and right edges thereof, and frequently shows image content that changes irregularly and quickly with time.

In practical use, the image determining unit 104 may be built in, for example, a personal computer, a notebook computer, or other high-performance electronic devices 100 at a signal output side thereof to analyze the output image signal through different ways, such as image structure comparison, specific image recognition, and R/G/B/W histogram analysis, so as to determine the program type 108 of the application program currently being run by the data processing unit 101.

Figure 2A:
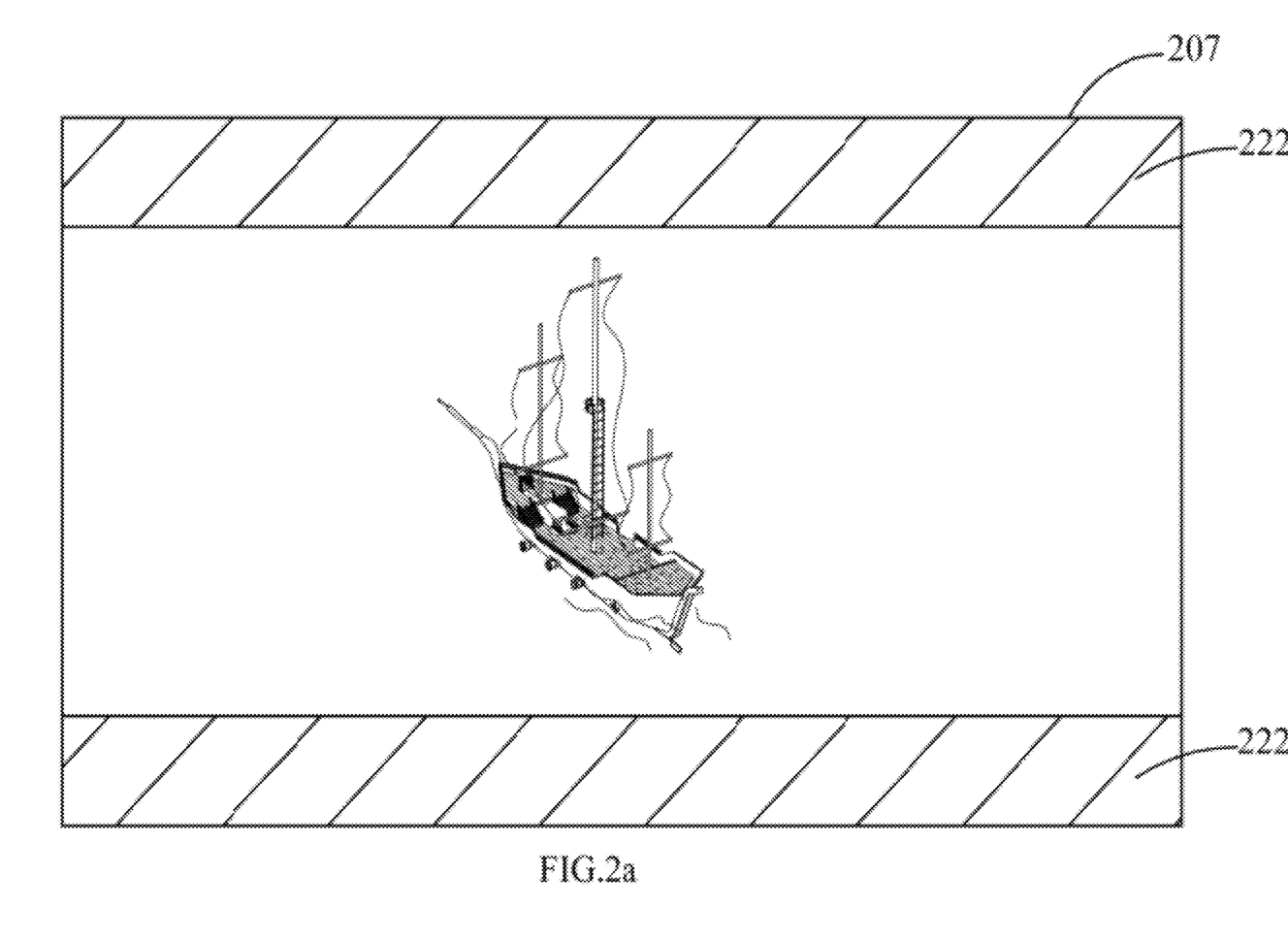
FIGS. 2a and 2b exemplify the arrangements of two common interface images for AV player programs.
Figure 2B:
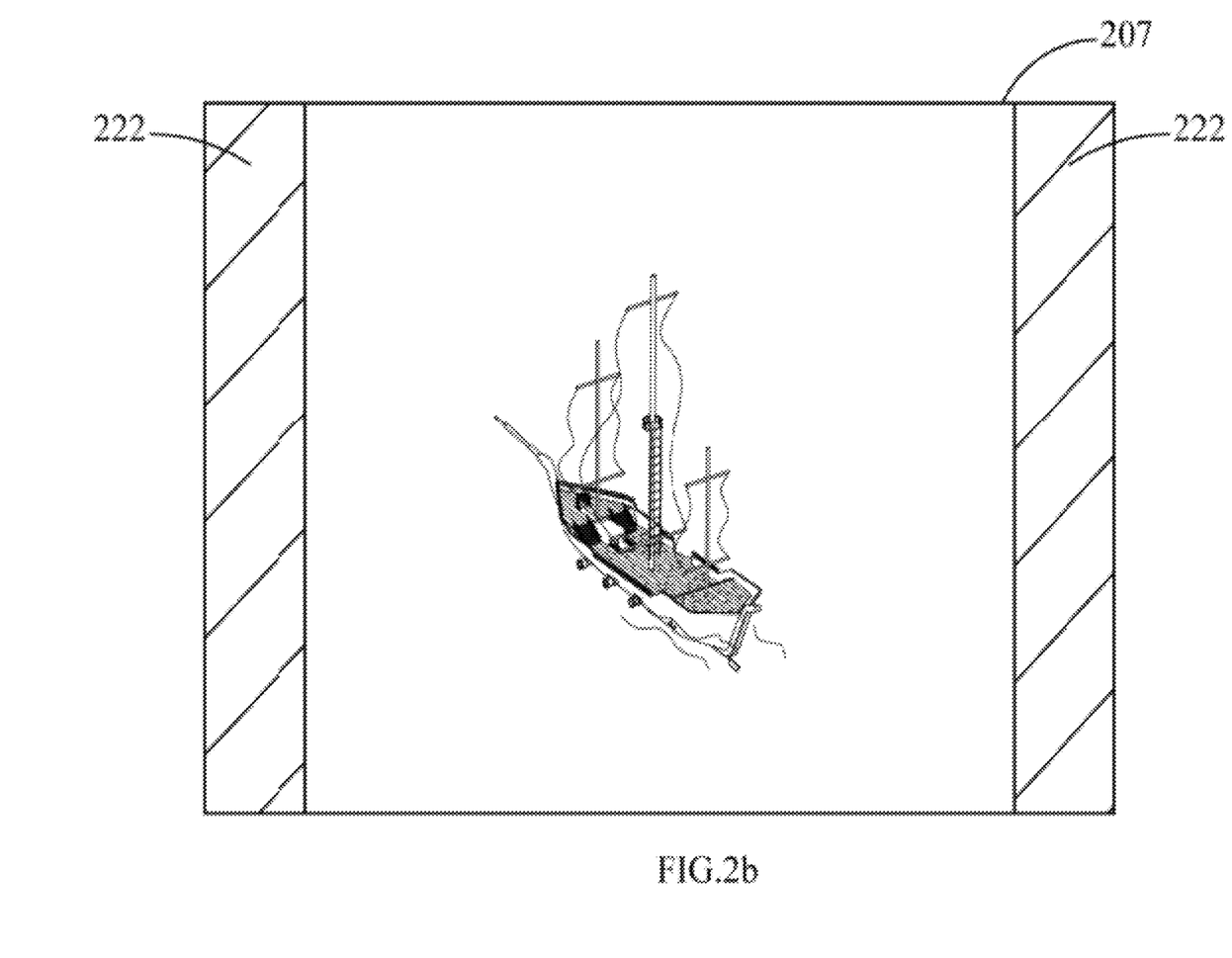

In the image structure comparison, an arrangement of the interface image 107 contained in the output signal is analyzed. Please refer to FIGS. 2a and 2b. While running the currently available AV player program, an interface image 207 thereof would usually have a widescreen aspect ratio to show an image content having an original aspect ratio of 4:3 or 16:9. Therefore, by analyzing the interface image 207 to check whether there are black bars 222 shown at upper and lower edges or left and right edges thereof and the percentage of the screen that is occupied by the black bars 222, it may be determined whether an AV player program is currently being executed.

In the specific image identification, the interface image 107 of the application program being run is analyzed to see whether there is at least one specific operating element icon at the upper or the lower edge of the interface image 107, so as to determine the program type 108. Please refer to FIG. 3. The currently commercially available word processing software programs, such as the Microsoft Office and Adobe Acrobat, all have their own unique icon 309. By image comparison, feature analysis, etc., it is able to identify whether the icon 309 shown on the interface image matches an icon in the database.

Figure 3:
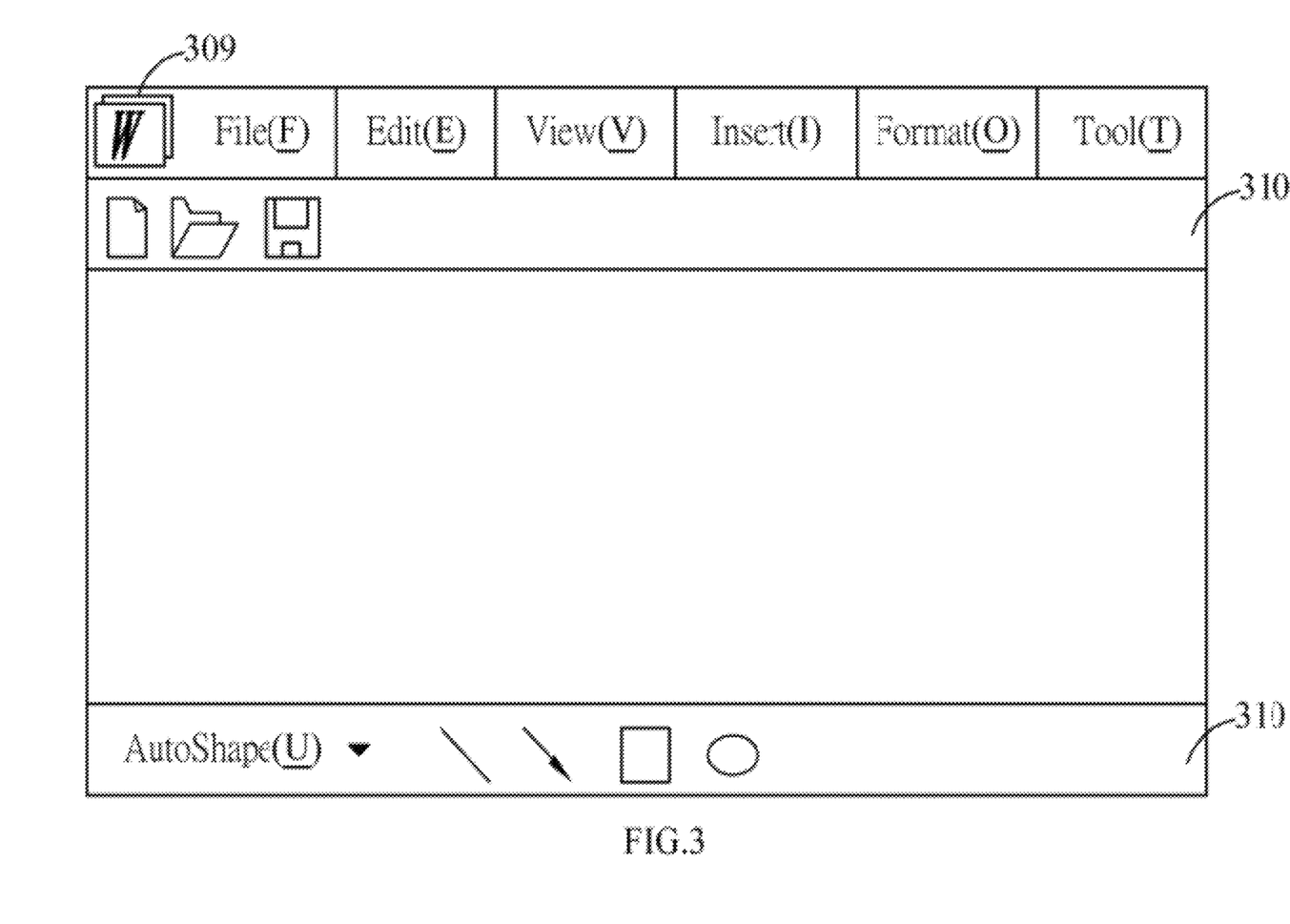
FIG. 3 exemplifies the arrangement of an interface image for a common word processing program.

In addition, the word processing programs and the image processing programs would usually show shortcut toolbars 310 near the upper and lower edge or left and right edge of the interface image thereof. By detecting differences in the shown shortcut toolbars 310, it is also able to determine the data processing unit is running a word processing program or an image processing program.

Figure 4A:
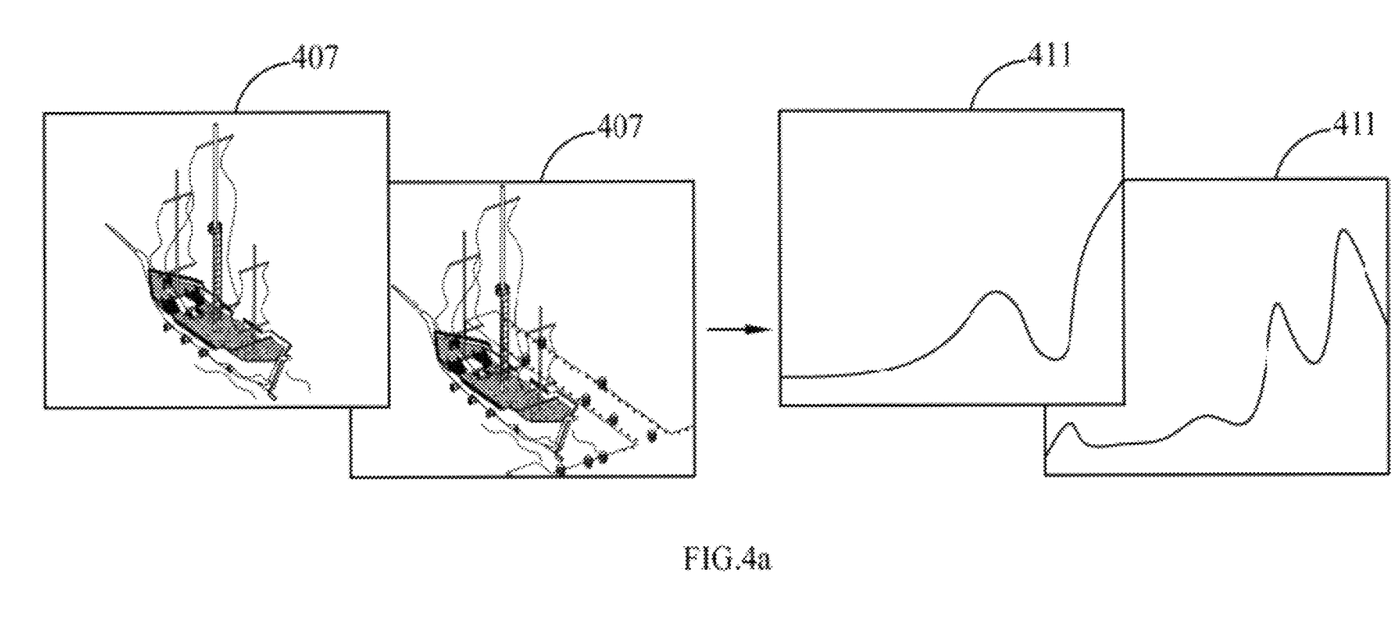
FIGS. 4a and 4b exemplify the R/G/B/W histograms for the AV player program and the word processing program, respectively.
Figure 4B:
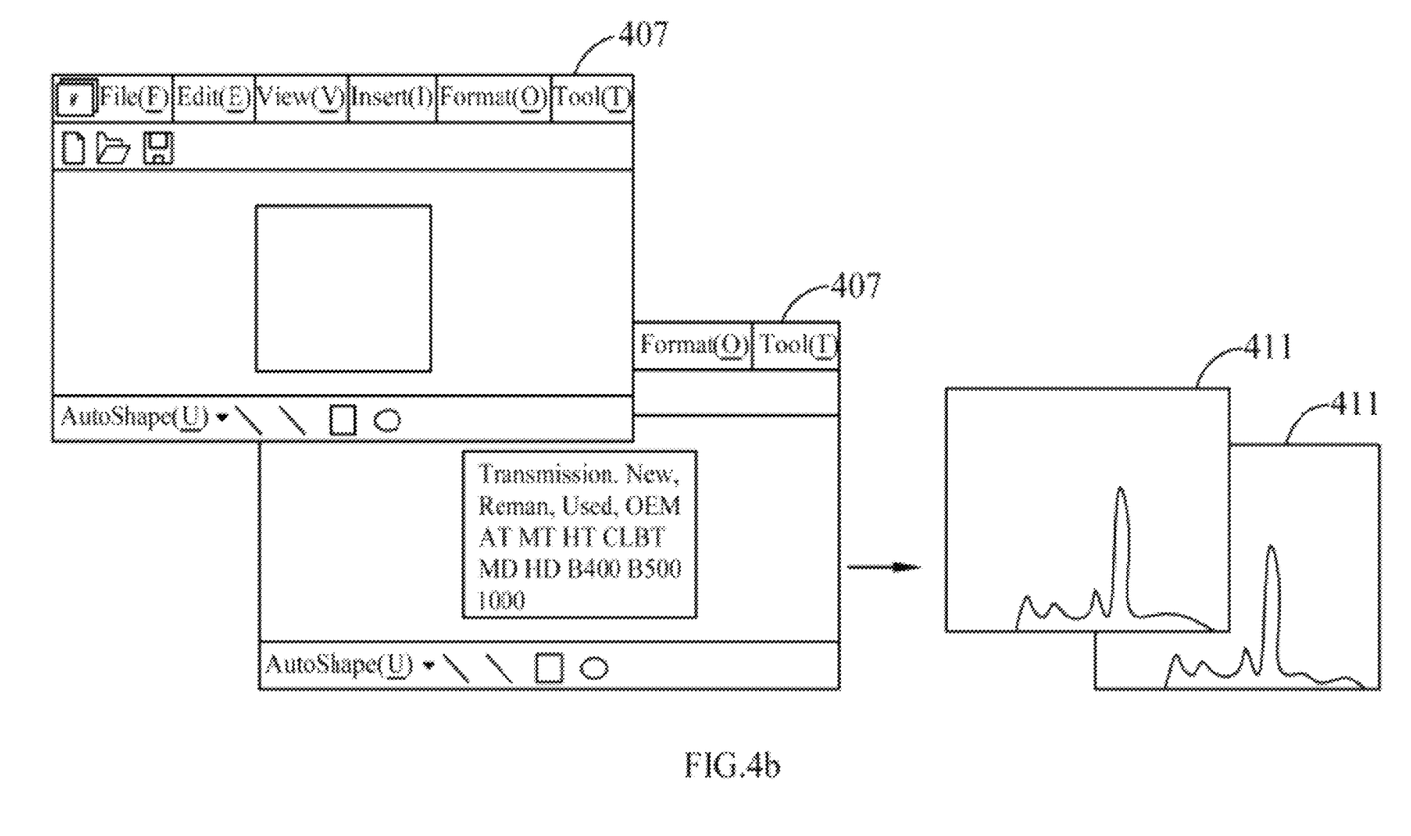

With respect to the R/G/B/W histogram analysis, in view that pictures showing image contents transmitted from different program types 108 will have different features, therefore, the transmitted image content shown on a picture may be analyzed based on an R/G/B/W histogram thereof to determine the program type of the application program being run. In FIG. 4a, there is shown an R/G/B/W histogram 411 of an interface image 407 output when an AV player program is executed. The presented interface image 407 is a dynamic image and accordingly, the R/G/B/W histogram 411 thereof will randomly and irregularly change with time. And, in FIG. 4b, there is shown an R/G/B/W histogram 411 of an interface image 407 output when a word processing software program is executed. As a feature of word processing, the R/G/B/W histogram 411 of the interface image 407 the word processing program is more stable and simpler, compared to that of the image processing software program.

The above-described ways of analysis are used to analyze the interface image 107 generated by the application program 1011, so as to determine the program type 108. Alternatively, in the case the data processing unit 101 runs the application program 1011 under the operation of an operating system, it is also possible to acquire the program type 108 of the application program being running directly via the operating system.

Figure 5:
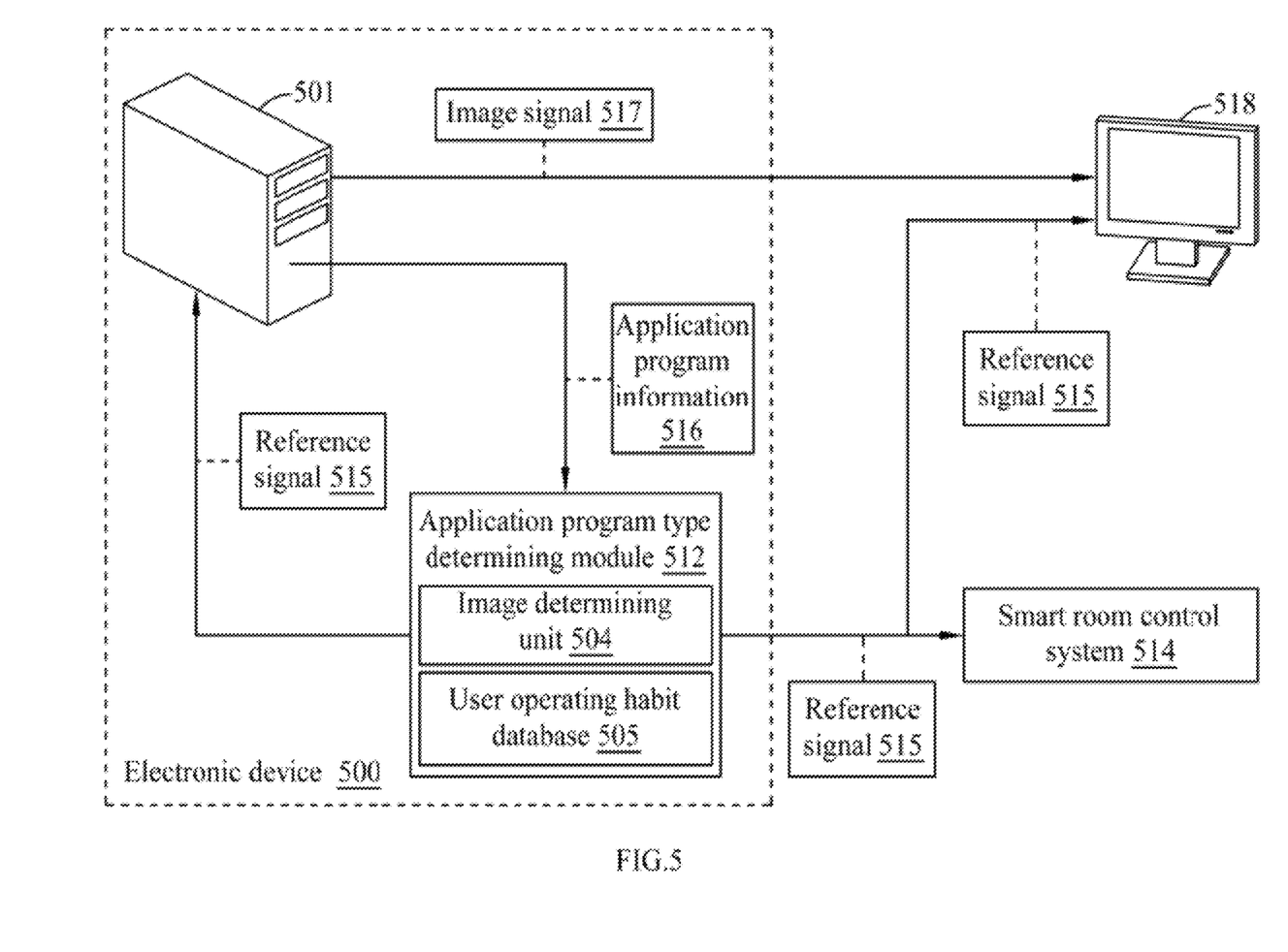
FIG. 5 is a conceptual view of an electronic device according to the present invention.

The user operating habit database 105 is operable to record a corresponding relationship 1051 between different program types and operating parameters of the visual output unit 113 and the audio output unit 103. For instance, when a computer runs a word processing program, such as PowerPoint, the user operating habit database 105 will record the image output setting is "output signal only to projector", "output signal only to display screen (LCD)", or "output signal to projector and display screen simultaneously to perform a lecture mode with dual-screen image projection". Or, while an image processing program is executed, such as Photoshop, high-resolution image output may be recorded according to the user's operating habit. Or, while an AV player program is executed, it may be recorded in the user operating habit database 105 an advanced connector, such as digital visual interface (DVI) connector or a high-definition multimedia interface (HDMI) connector, is used to output the signal. Or, while a word processing program is executed, it may be recorded in the user operating habit database 105 a video graphics array (VGA) connector is used to output standard colors. Or, while a multimedia player program is executed, it may be recorded in the user operating habit database 105 the audio output unit 103 is actuated; and while a word processing program is executed, such as Word or Excel, it is recorded in the user operating habit database 105 a mute state is set, lest a user running the word processing program to give a lecture or briefing should be interfered by unexpected voice reminder by other software program. Further, the user operating habit database 105 may also record a corresponding relationship between the application program 1011 and the operation of a smart room control system 503. For example, it is recorded in the user operating habit database 105 the room light is automatically dimmed when executing an image projection mode.

The input unit 106 allows a user to input an operating command to modify the operating parameters of the visual output unit 113 or the audio output unit 103. Moreover, the data processing unit 101 may update the user operating habit database 105 according to the user's modification.

The electronic device 100 according to the present invention, which is a personal computer, a notebook computer, or other high-performance electronic devices, can search the user operating habit database 105 for matching operating parameters based on the program type 108, so as to control the visual output unit 113 or the audio output unit 103 to meet the user's actual using condition. Therefore, it is not necessary for the user to repeat the same operation to set operating parameters on the electronic device 100 each time executing the application program 1011. And, before controlling the visual output unit 113 or the audio output unit 103 based on the operating parameters recorded in the user operating habit database 105, the electronic device 100 will show a message for the user to know which operating parameters are to be changed.

Please refer to FIG. 5, which is a conceptual view of an electronic device 500 according to an embodiment of the present invention. As shown, a data processing unit 501 transmits an image signal 517 to a display device 518. An application program type determining module 512 is built in the electronic device 500 at a signal output side thereof for receiving application program information 516 transmitted from the data processing unit 501. When the application program type determining module 512 receives the application program information 516, an image determining unit 504 in the application program type determining module 512 may analyze an application program interface image included in the application program information 516, so as to know the type of the application program being run by the data processing unit 501. In addition, when the data processing unit 501 operates under an operating system, the application program type determining module 512 is able to know the type of the application program currently being run by the data processing unit 501 via the application program information 516 transmitted from the operating system. Therefore, the procedure of analyzing the application program interface image by the image determining unit 504 may be omitted. Thereafter, according to the determined program type, the application program type determining module 512 may retrieve corresponding operating parameters from a user operating habit database 505, and send a reference signal 515 containing the retrieved operating parameters to the data processing unit 501, the display device 518 or a smart room control system 514 for making necessary fine adjustment, so that the operating environment is adjusted according to the user's operating habit when using the application program.

Figure 6:
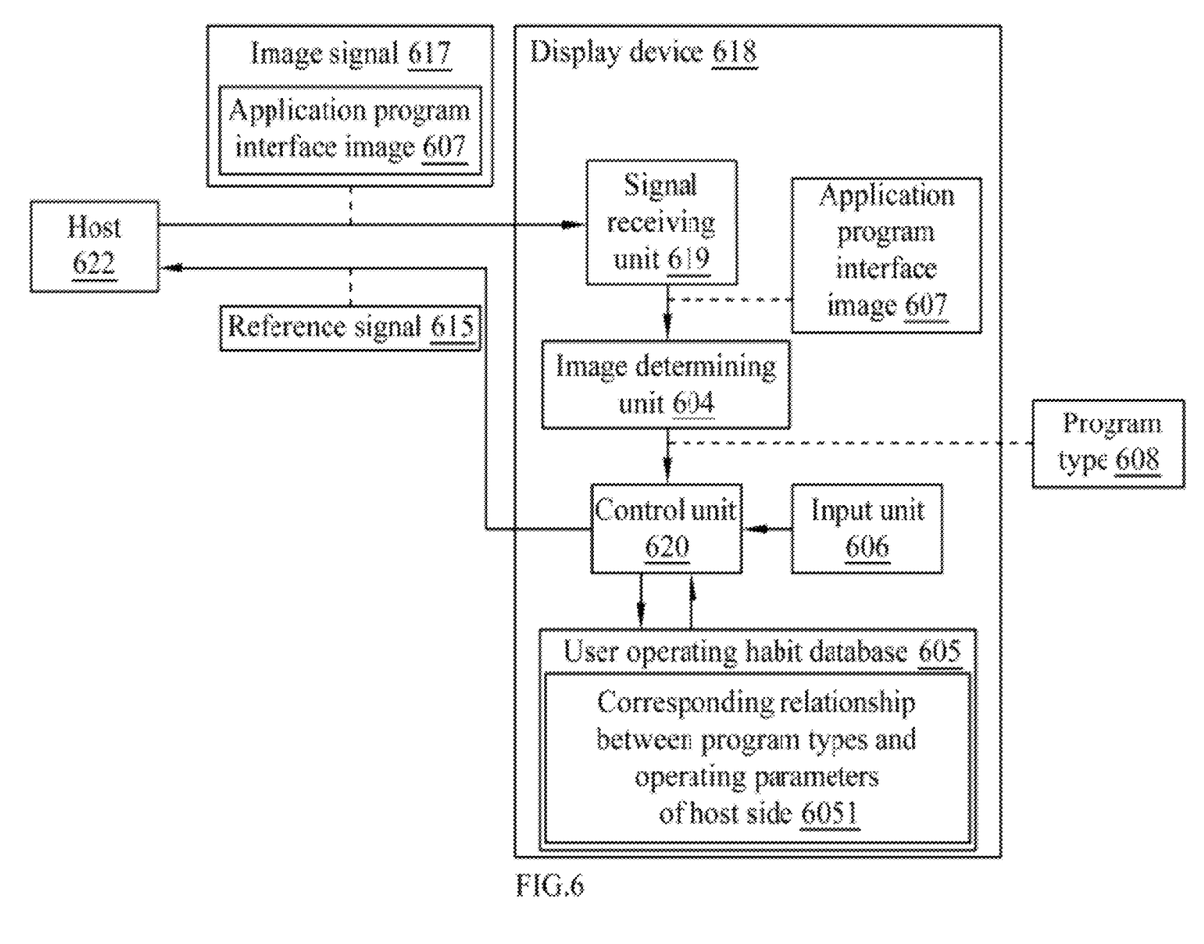
FIG. 6 is a block diagram of a display device according to the present invention.

FIG. 6 is a block diagram of a display device 618 according to the present invention. As shown, the display device 618 includes a signal receiving unit 619, an image determining unit 604, a user operating habit database 605, a control unit 620 and an input unit 606. The signal receiving unit 619 receives an image signal 617, which contains an application program interface image 607.

The image determining unit 604 analyzes the application program interface image 607 to determine the program type 608 of an application program being executed. In practical implementation, different ways, such as image structure comparison, specific image recognition, or R/G/B/W histogram analysis, may be utilized in determining the program type 608.

The user operating habit database 605 records a corresponding relationship 6051 between each program types and operating parameters of a host 622.

The control unit 620 generates a reference signal 615 according to the program type 608 as determined by the image determining unit 604 and the corresponding relationship 6051 between the program type and the operating parameters of the host as recorded in the user operating habit database 605, and sends the reference signal 615 to the host 622, so as to change the operating parameters of the host 622. The operating parameters include, for example, image output settings, image resolution, image contrast, image brightness, image color depth, output signal type, sound volume, etc. Moreover, based on the corresponding relationship 6051 as recorded in the user operating habit database 605, the control unit 620 may also control a smart room control system to change ambient light.

The input unit 606 allows a user to modify the operating parameters of the host 622, and the control unit 620 may update the user operating habit database 605 according to the user's modification.

Figure 7:
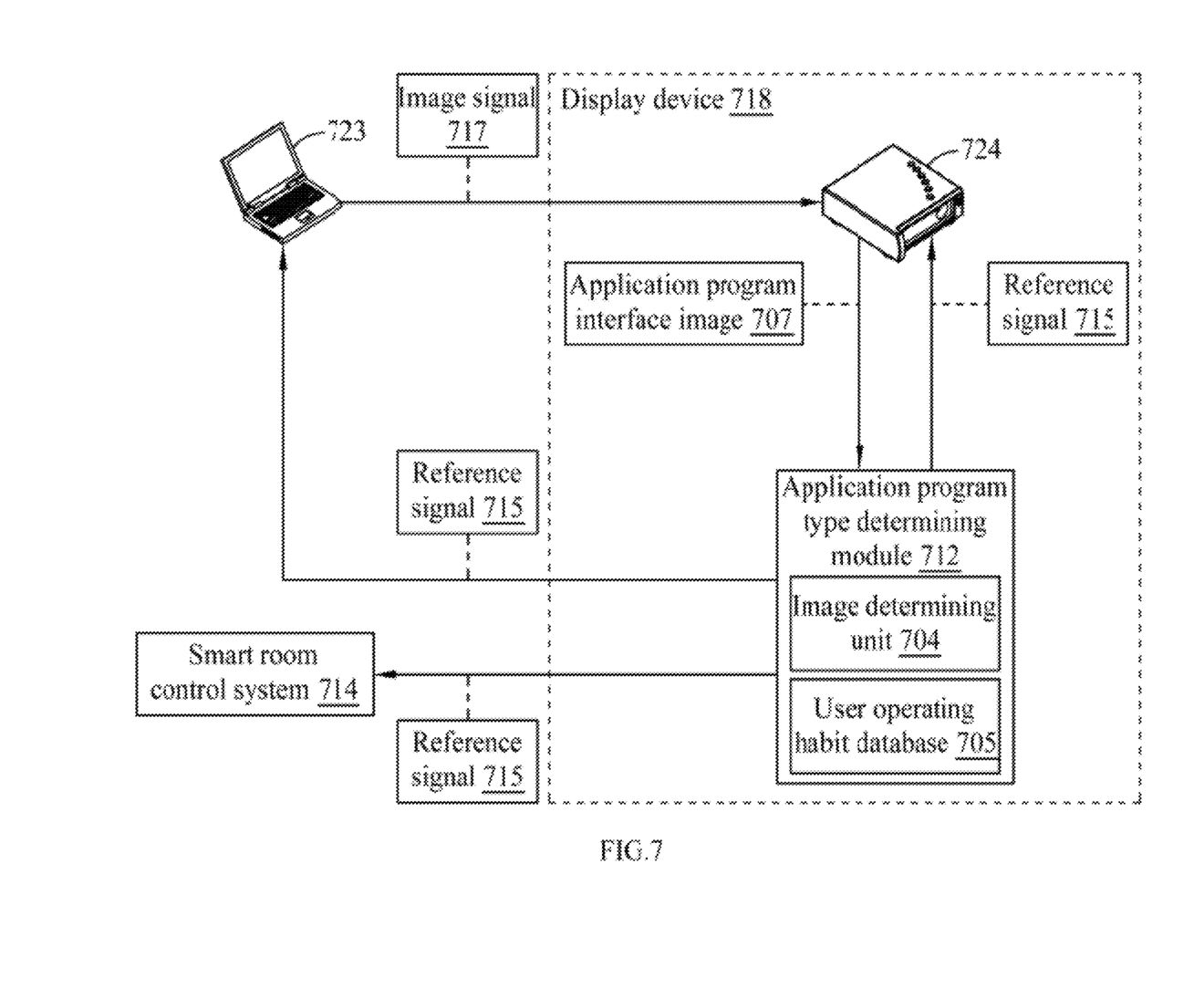
FIG. 7 is a conceptual view of a display device according to the present invention.

Please refer to FIG. 7, which is a conceptual view of a display device 718 according to an embodiment of the present invention. In the illustrated embodiment, the host is a portable computer 723, and the display device is a projector 724. An application program type determining module 712 is built in the projector 724. When a user prepares to give a lecture or briefing and transmits an image signal 717 from the portable computer 723 to the projector 724, an image determining unit 704 in the application program type determining module 712 analyzes an application program interface image 707 contained in the image signal 717 output by the portable computer 723 to thereby know that an image projection software program is currently being executed. Thereafter, the application program type determining module 712 retrieves from a user operating habit database 705 the user's past operating parameters corresponding to that image projection software program, such as turning off sound output and dimming room light, etc., and accordingly sends a reference signal 715 to the portable computer 723, the projector 724, and/or a smart room control system 714 to finely adjust the operating environment.

Figure 8:
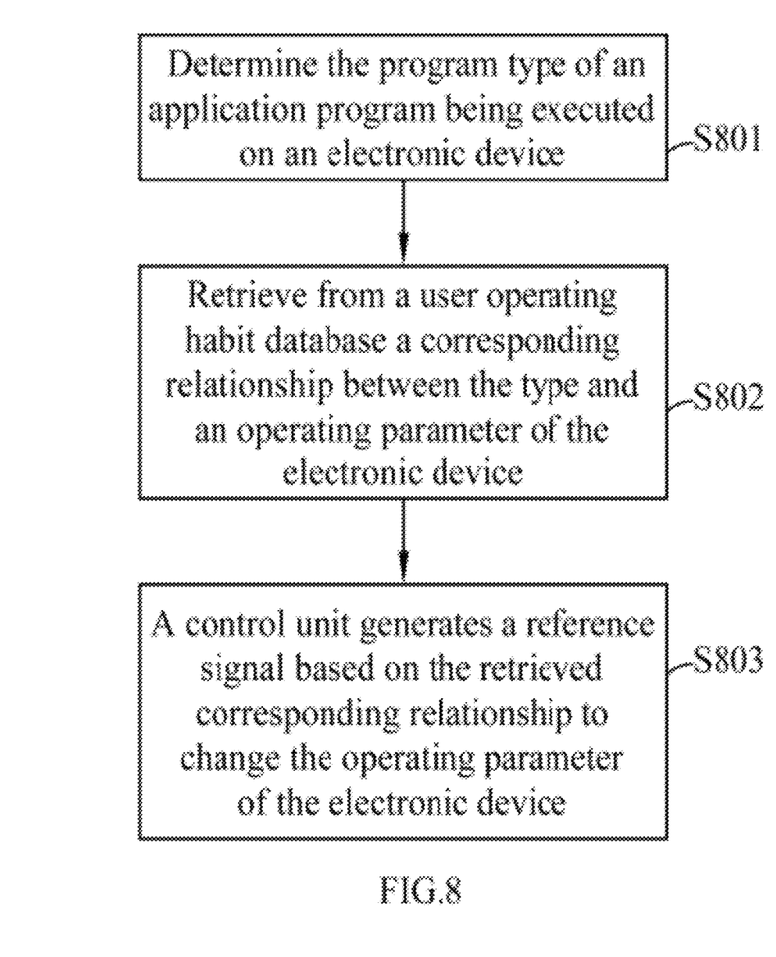
FIG. 8 is a flowchart showing the steps included in a method of controlling AV output of an electronic device according to the present invention.

Please refer to FIG. 8, which is a flowchart showing the steps included in a method of controlling audio/video output of an electronic device according to the present invention. In a step S801, when an electronic device executes an application program, the program type of the application program is acquired from a command signal output by the electronic device via an operating system of the electronic device, or is determined by an image determining unit of the electronic device through analysis of an interface image of the application program being executed. Preferably, the image determining unit may utilize different ways, including, for example, image structure comparison, specific image recognition, or R/G/B/W histogram to analyze the interface image generated when the application program is executed, so as to determine whether the application program currently being executed by the electronic device is a word processing program, an image processing program, or an AV player program, or other software programs. Thereafter, in a step S802, operating parameters of the electronic device corresponding to the program type acquired or determined in step S801 are retrieved from a user operating habit database. The operating parameters include, but not limited to, image resolution, image contrast, image brightness, image projection mode, type of output image signal, environment settings, output sound effect, and/or sound volume. Finally, in step S803, a control unit of the electronic device generates a reference signal based on the operating parameters that are determined as being closest to the operating environment in which the user currently operates and retrieved in step S802. The reference signal is sent to the electronic device, or to a visual output unit and an audio output unit of the electronic device, or to an external smart room control system, so that the electronic device, the visual and audio output units, or the smart room control system are changed or adjusted to meet the user's operating habit when executing the application program.

With the above-described electronic devices, the display devices, and the method of controlling AV output of an electronic device according to the present invention, operating parameters for different operating environments in which a user executes different application programs are recorded, and the recorded information is used as a basis by the present invention in determining environment settings to adapt the electronic device or the display device to the user's actual requirements.

The present invention has been described with some preferred embodiments thereof and it is understood that many changes and modifications in the described embodiments may be carried out without departing from the scope and the spirit of the invention that is intended to be limited only by the appended claims.

What is claimed is:

1. An electronic device, comprising:
   a data processing unit executing an application program;
   a visual output unit outputting an image signal;
   an audio output unit outputting an audio signal;
   an image determining unit for determining the program type by analyzing an interface image generated by the application program; and
   a user operating habit database recording a corresponding relationship between program types and operating parameters of the visual output unit or the audio output unit; wherein the data processing unit acquires the program type of the application program and searches the user operating habit database for the operating parameters corresponding to the acquired program type, and control the visual output unit or the audio output unit according to the searched operating parameters.

2. The electronic device as claimed in claim 1, wherein the image determining unit determines the application program as a word processing program, an image processing program, or an AV player program by analyzing whether there is at least a specific operating element icon shown near an upper or a lower edge of the interface image.

3. The electronic device as claimed in claim 1, wherein the image determining unit determines the application program as a word processing program, an image processing program, or an AV player program by analyzing arrangements of the interface image.

4. The electronic device as claimed in claim 1, wherein the image determining unit determines the application program as a word processing program, an image processing program, or an AV player program by analyzing an R/G/B/W histogram of the interface image.

5. The electronic device as claimed in claim 1, wherein the operating parameters of the visual output unit comprises an image resolution, an image contrast, an image brightness, an image projection mode, an output image signal type or environment settings.

6. A display device for receiving an image signal output from a host, comprising:
   a signal receiving unit receiving the image signal, the image signal containing an interface image of an application program;
   an image determining unit determining a program type of the application program by analyzing the interface image of the application program;
   a user operating habit database recording a corresponding relationship between the program type and operating parameters of the host; and
   a control unit generating a reference signal based on the program type determined by the image determining unit and the corresponding relationship recorded in the user operating habit database, and sending the reference signal to the host for allowing the host to change the operating parameters of the host according to the reference signal.

7. The display device as claimed in claim 6, wherein the image determining unit determines the application program as a word processing program, an image processing program, or an AV player program by analyzing whether there is at least one specific operating element icon shown near an upper or a lower edge of the interface image.

8. The display device as claimed in claim 6, wherein the image determining unit determines the application program as a word processing program, an image processing program, or an AV player program by analyzing arrangements of the interface image.

9. The display device as claimed in claim 6, wherein the image determining unit determines the application program as a word processing program, an image processing program, or an AV player program by analyzing an R/G/B/W histogram of the interface image.

10. The display device as claimed in claim 6, wherein the operating parameters of the host comprising an image resolution, an image contrast, an image brightness, an image projection mode, an output image signal type or environment settings.

11. A method of controlling audio/video output of an electronic device, comprising the following steps of:
    using an image determining unit to analyze an interface image of an application program executed on the electronic device, so as to determine the program type;
    retrieving a corresponding relationship between the program type and an operating parameter of the electronic device from a user operating habit database; and
    using a control unit to generate a reference signal based on the corresponding relationship for changing the operating parameter of the electronic device.

12. The method of controlling audio/video output of an electronic device as claimed in claim 11, wherein the image determining unit further determines whether the program type is a word processing program, an image processing program, or an AV player program by analyzing whether there is at least one specific operating element icon shown near an upper or a lower edge of the interface image of the application program.

13. The method of controlling audio/video output of an electronic device as claimed in claim 11, wherein the image determining unit further determines whether the program type is a word processing program, an image processing program, or an AV player program by analyzing arrangements of the interface image.

14. The method of controlling audio/video output of an electronic device as claimed in claim 11, wherein the image determining unit further determines whether the program type is a word processing program, an image processing program, or an AV player program by analyzing an R/G/B/W histogram of the interface image.

15. The method of controlling audio/video output of an electronic device as claimed in claim 11, wherein the operating parameter of the electronic device comprising an image resolution, an image contrast, an image brightness, an image projection mode, an output image signal type or environment settings.

16. The method of controlling audio/video output of an electronic device as claimed in claim 11, further comprising an input step, in which the user inputs to modify the corresponding relationship between the program type and the operating parameter of the electronic device.

* * * * *